US012413329B2

United States Patent
Ben-Ezra et al.

(10) Patent No.: US 12,413,329 B2
(45) Date of Patent: Sep. 9, 2025

(54) SYSTEM FOR PULSED LASER OPTICAL DATA TRANSMISSION WITH RECEIVER RECOVERABLE CLOCK

(71) Applicant: NewPhotonics Ltd., Petah Tikva (IL)

(72) Inventors: Yosef Ben-Ezra, Petah Tikva (IL); Yaniv Ben-Haim, Petah Tikva (IL)

(73) Assignee: NewPhotonics Ltd., Petah Tikva (IL)

( * ) Notice: Subject to any disclaimer, the term of this patent is extended or adjusted under 35 U.S.C. 154(b) by 0 days.

(21) Appl. No.: 18/675,378

(22) Filed: May 28, 2024

(65) Prior Publication Data

US 2024/0313879 A1  Sep. 19, 2024

Related U.S. Application Data

(63) Continuation of application No. 17/916,807, filed as application No. PCT/IB2022/050063 on Jan. 5, 2022, now Pat. No. 12,034,527.

(Continued)

(51) Int. Cl.
*H04J 14/08* (2006.01)
*H04B 10/50* (2013.01)
(Continued)

(52) U.S. Cl.
CPC ............ *H04J 14/08* (2013.01); *H04B 10/524* (2013.01); *H04B 10/60* (2013.01); *H04B 10/40* (2013.01); *H04B 10/50* (2013.01)

(58) Field of Classification Search
None
See application file for complete search history.

(56) References Cited

U.S. PATENT DOCUMENTS 5,519,526 A * 5/1996 Chua ...................... H04J 14/005
398/139
6,118,566 A * 9/2000 Price .................. H04J 14/0298
398/1

(Continued)

FOREIGN PATENT DOCUMENTS

| JP | 2002341301 A | 11/2002 |
| JP | 2005005897 A | 1/2005 |
| JP | 2005070189 A | 3/2005 |

OTHER PUBLICATIONS

Office Action in related JP patent application 2023-546179, dated Jul. 23, 2024.
(Continued)

*Primary Examiner* — Darren E Wolf
(74) *Attorney, Agent, or Firm* — Nathan & Associates Patent Agents Ltd.; Menachem Nathan

(57) ABSTRACT

A system, comprising an optical transmitter configured to modulate a pulsed laser signal based on a plurality of data signals to form a plurality of modulated optical data signals, optical time division multiplex the plurality of modulated optical data signals to obtain a multiplexed optical data signal, and transmit the multiplexed optical data signal together with an optical clock signal derived from the pulsed laser signal; and an optical receiver that includes a clock recovery branch configured to recover the optical clock signal into a plurality of phase-shifted recovered optical clock signals and a data branch with a plurality of saturable absorbers (SA), each SA being in optical communication with one of the phase-shifted recovered optical clock signals and configured to receive the multiplexed optical data signal and to transmit of one of the plurality of modulated optical data signals according to the recovered optical clock signal.

14 Claims, 13 Drawing Sheets

Related U.S. Application Data

(60) Provisional application No. 63/142,684, filed on Jan. 28, 2021.

(51) Int. Cl.
  *H04B 10/524* (2013.01)
  *H04B 10/60* (2013.01)
  *H04B 10/40* (2013.01)

(56) References Cited

U.S. PATENT DOCUMENTS

| | | | |
|---|---|---|---|
| 6,411,415 B1 | 6/2002 | Smets et al. | |
| 6,483,620 B1* | 11/2002 | Epworth | H04B 10/2569 398/154 |
| 2003/0058500 A1 | 3/2003 | Sugawara | |
| 2004/0101311 A1* | 5/2004 | Grohn | H04B 10/0771 398/154 |
| 2008/0260384 A1 | 10/2008 | Tsuji et al. | |
| 2016/0112143 A1* | 4/2016 | Yu | H04B 10/6165 398/76 |
| 2017/0317750 A1* | 11/2017 | Chaffee | H04B 10/1123 |

OTHER PUBLICATIONS

Search Report in related EP application 22745441.0, dated Mar. 25, 2024.

Deng KL et al: "All-optical clock extraction for self-clocked demultiplexing at 100 GB/s", CLEO '97: Conference on Lasers and Electro-Optics. Baltimore, MD, May 18-23, 1997; [CLEO : Conference On Lasers and Electro-Optics], New York, IEEE, US, May 18, 1997 (May 18, 1997), pp. 412-413, XP032305568, DOI: 10.1109/CLEO.1997.603350 ISBN: 978-0-7803-4125-8.

Den K-L et al: "Unbalanced Toad for Optical Data and Clock Separation in Self-Clocked Transparent OTDM Networks", IEEE Photonics Technology Letters, IEEE, USA, vol. 9, No. 6, Jun. 1, 1997 (Jun. 1, 1997), pp. 830-832, XP000692428, ISSN: 1041-1135, DOI: 10.1109/68.585005.

Yokoyama H et al: "Two-stage all-optical subharmonic clock recovery using modelocked semiconductor lasers", Electronics Letters, the Institution of Engineering and Technology, GB, vol. 36, No. 18, Aug. 31, 2000 (Aug. 31, 2000), pp. 1577-1578, XP006015678, ISSN: 0013-5194, DOI: 10.1049/EL:20001124.

\* cited by examiner

SYSTEM FOR PULSED LASER OPTICAL DATA TRANSMISSION WITH RECEIVER RECOVERABLE CLOCK

CROSS REFERENCE TO RELATED APPLICATIONS

This is a continuation of U.S. patent application Ser. No. 17/916,807 filed Oct. 4, 2022 (now allowed), which was a 371 application from international patent application PCT/IB2022/050063 filed Jan. 5, 2022, which claims the benefit of priority of U.S. Provisional patent application No. 63/142,684 filed Jan. 28, 2021, and which is incorporated herein by reference in its entirety.

FIELD

Embodiments of various systems disclosed herein relate in general to signal transmission and more specifically to systems for transmission of high data rate optical signals.

BACKGROUND

Coherent and non-coherent optical transceivers for high data rate transmissions such as 400 Gbps and beyond generally utilize digital signal processors (DSPs). The DSPs provide one or more of pre or post compensation of chromatic dispersion, other channel impairments, multiplexing and demultiplexing, implementation of high-level modulation formats and/or error correction to enable such high rates such as when using PAM4 (or other modulation).

The required DSPs have high power consumption—typically 8W for a DSP in a system with a data rate of 400 Gbps, or higher power consumption for greater data rates, thus increasing the power requirements of high bitrate systems. Further, the multiplexing of multiple data channels and the other signal processing on the electrical signals introduces latency into the signal transmission. Still further, DSPs have a limited maximum throughput due to the constraints of electrical processing. It would be therefore be desirable to provide transmission systems featuring high data rates without the need for DSPs to thereby reduce the power consumption and latency and overcome the electrical bandwidth bottleneck.

SUMMARY

Embodiments disclosed herein relate to systems, devices and methods that enable high data rate optical signals with reduced power consumption and reduced latency. The systems as described herein make use of all-optical transmitters and receivers such that no DSP is required, thereby reducing the power requirements and latency of the system for sending equivalent data rates. An all-optical transmitter receiver arrangement also reduces computational complexity (such as needed by a DSP). In some embodiments, the all-optical transmitters and receivers are provided as integrated circuits (ICs) on shared semiconductor substrates to further reduce power and size requirements.

In order to provide an all-optical receiver, the clock (local oscillator) used in the transmitted modulated signal is needed at the receiver. A presently disclosed system uses a modulated pulsed laser for data transmission, utilizing the periodic pulses as a clock. The clock based on the pulsed laser is transmitted along with the data signal and recovered by the receiver to thereby serve as the required local oscillator. In some embodiments, orthogonal transverse modes are used, one carrying the data and the other carrying the clock. In some embodiments, separate data and clock channels are transmitted to the receiver. To enable all-optical demodulation based on the received clock, the receiver advantageously includes a saturable absorber (SA) configured to transmit received data pulses when saturated by clock pulses to thereby recover the transmitted data signals.

In some embodiments, optical time division multiplexing (OTDM) is provided for transmission of multiple data channels. Use of optical multiplexing reduces latency and complexity compared with electrical multiplexing such as in DSPs. In some embodiments, systems as disclosed herein may be duplicated or may be provided with integrated WDM systems for transmission of greater numbers of channels per fiber optic cable. In some embodiments, single mode fiber optic cable is used with unidirectional operation. In some embodiments, full duplex fiber optic cable is used with bidirectional operation. Further, dispersion management is also handled optically in the receiver to compensate for dispersion in transmission and for dispersion that may be caused by the saturable absorbers. As above, use of optical dispersion management reduces the computational complexity of the solution.

In some embodiments, a system comprises: an optical transmitter that includes a pulsed laser for outputting a pulsed laser signal, wherein the optical transmitter is configured to modulate the pulsed laser signal based on a plurality of data signals to form a plurality of modulated optical data signals, to optically time division multiplex the plurality of modulated optical data signals to obtain a multiplexed optical data signal, and to transmit the multiplexed optical data signal together with an optical clock signal derived from the pulsed laser signal; and an optical receiver that includes a clock recovery branch and a data branch, wherein the clock recovery branch is configured to recover and phase-shift the optical clock signal into a plurality of phase-shifted recovered optical clock signals, wherein the data branch includes a plurality of SAs, and wherein each SA is in optical communication with one of the plurality of phase-shifted recovered optical clock signals and is configured to receive the multiplexed optical data signal and to transmit one of the modulated optical data signals received in the multiplexed optical data signal according to the one of the plurality of phase-shifted recovered optical clock signals.

In some embodiments, the optical clock signal and the multiplexed optical data signal are transmitted by the optical transmitter in orthogonal transverse modes over a single mode fiber optic cable. In some embodiments, the optical clock signal and multiplexed optical data signal are each transmitted by the optical transmitter over a separate cable in a full-duplex fiber optic cable. In some embodiments, wherein a clock pulse from one of the plurality of phase-shifted recovered optical clock signals saturates a related SA to thereby cause the SA to release a pulse from one of the plurality of modulated optical data signals.

In some embodiments, the clock recovery branch includes a splitter and a phase-shifter for extracting the optical clock signal into a plurality of phase-shifted extracted optical clock signals. In some embodiments, the optical receiver further includes one or more dispersion managers configured for dispersion correction of the plurality of modulated optical data signals and the plurality of phase-shifted extracted optical clock signals. In some embodiments, the optical receiver further comprises output components configured for extracting the plurality of data signals from each of the plurality of modulated optical data signals.

In some embodiments, the pulsed laser is a selected from the group consisting of a bulk laser, a quantum well laser, a quantum dot laser, a semiconductor mode-locked laser and a mode-locked integrated external-cavity surface emitting laser. In some embodiments, the pulsed laser has a pulse repetition rate between 5 GHz to 100 GHz. In some embodiments, the optical receiver includes an optical amplifier (OA). In some embodiments, the OA is a quantum dot semiconductor optical amplifier.

In some embodiments, the modulation is one of pulsed amplitude modulation (PAM) or quadrature amplitude modulation (QAM). In some embodiments, the plurality of data signals includes between 2-16 data signals per wavelength. In some embodiments, the plurality of data signals are digital signals and/or analog signals.

In some embodiments, a transmission system comprises a first transceiver and a second transceiver, wherein each of the first and second transceivers includes an optical transmitter, an optical receiver and a controller, wherein each optical transmitter is configured to modulate the pulsed laser signal based on a plurality of data signals to form a plurality of modulated optical data signals, to optically time division multiplex the plurality of modulated optical data signals to obtain a multiplexed optical data signal, and to transmit the multiplexed optical data signal together with an optical clock signal derived from the pulsed laser signal, and wherein each optical receiver includes a clock recovery branch and a data branch, wherein the clock recovery branch is configured to recover and phase-shift the optical clock signal into a plurality of phase-shifted recovered optical clock signals, wherein the data branch includes a plurality of SAs, and wherein each SA is in optical communication with one of the plurality of phase-shifted recovered optical clock signals and is configured to receive the multiplexed optical data signal and to transmit one of the modulated optical data signals received in the multiplexed optical data signal according to the one of the plurality of phase-shifted recovered optical clock signals.

In some embodiments, each controller is configured for monitoring transceiver performance and for performing adjustment of the transmitter and receiver in order to optimize the transceiver performance. In some embodiments, the monitoring includes monitoring of one or more of bit error rate, data throughput, frame loss, or jitter. In some embodiments, each transceiver is formed on a common semiconductor substrate as an IC.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

Embodiments disclosed herein are described, by way of example only, with reference to the following accompanying drawings, wherein.

DETAILED DESCRIPTION

Figure 1A:
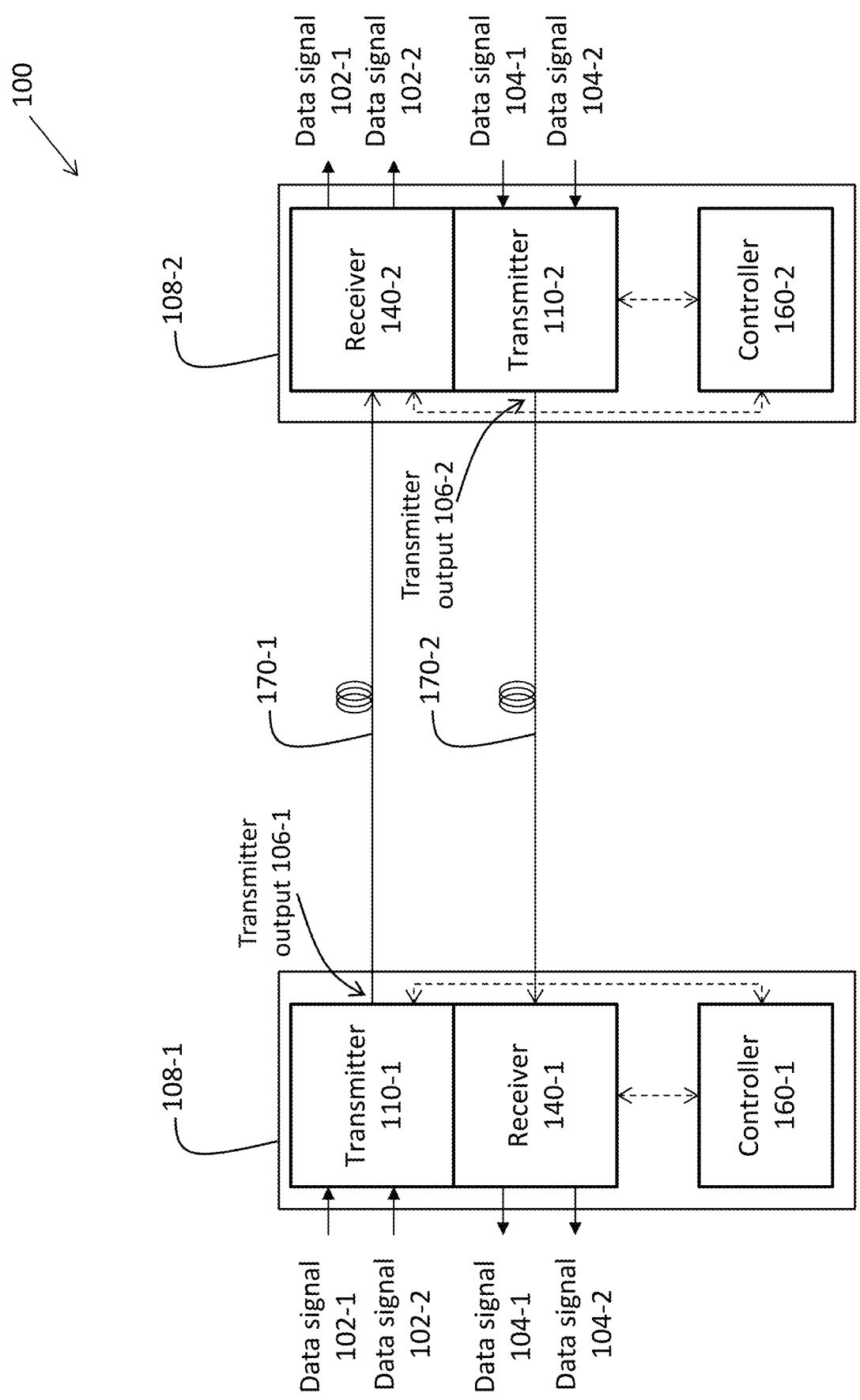
FIG. 1A shows an optical system for data transmission over single mode fiber according to some embodiments.

Aspects of embodiments relate to systems, devices and methods that enable high data rate optical signals with reduced power consumption, reduced latency and reduced computational complexity. FIGS. 1A-1G show an optical system for data transmission according to some embodiments. As shown in FIG. 1A, an optical transmission system 100 includes transceivers 108-1 and 108-2. Each transceiver 108 includes an optical transmitter 110, an optical receiver 140, and a controller 160.

Transmitter 110-1 is in optical communication with receiver 140-2 over a single mode fiber optic cable 170-1 for transmitting unidirectional data signals 102, and transmitter 110-2 is in optical communication with receiver 140-1 over a single mode fiber optic cable 170-2 for transmitting unidirectional data signals 104. In some embodiments, a single fiber optic cable 170 may be used for bidirectional optical communication such as by using different wavelengths for transmitting data signals 102 and 104. Data signals, such as signals 102 and 104 are also referred to herein as "channels". In some embodiments, each transceiver 108-1 and 108-2 is provided as an integrated circuit (IC) on a shared semiconductor substrate.

Data signals 102, 104 are electrical data signals. In some embodiments, data signals 102, 104 are digital signals and the laser pulse repetition rate is equal or larger than the digital signal rate. In some embodiments, data signals 102, 104 are analog electrical signals and the laser pulse repetition rate is equal or larger than the Nyquist frequency of the analog electrical signals. In some embodiments, data signals 102, 104 are a combination of digital and analog signals. FIGS. 1A-1G illustrate transmission of two channels in each transmission direction (data signals 102-1 and 102-2 and data signals 104-1 and 104-2) for simplicity but it should be appreciated that more than two channels may be multiplexed and transmitted by system 100. In some embodiments, between 2-16 data signals per wavelength are supported.

A controller 160 is a computing device as defined herein. Controller 160-1 is in data communication with transmitter 110-1 and receiver 140-1, and controller 160-2 is in data communication with transmitter 110-2 and receiver 140-2 for controlling each of transceivers 108-1 and 108-2 for the operation of system 100 as described further below.

Figure 1B:
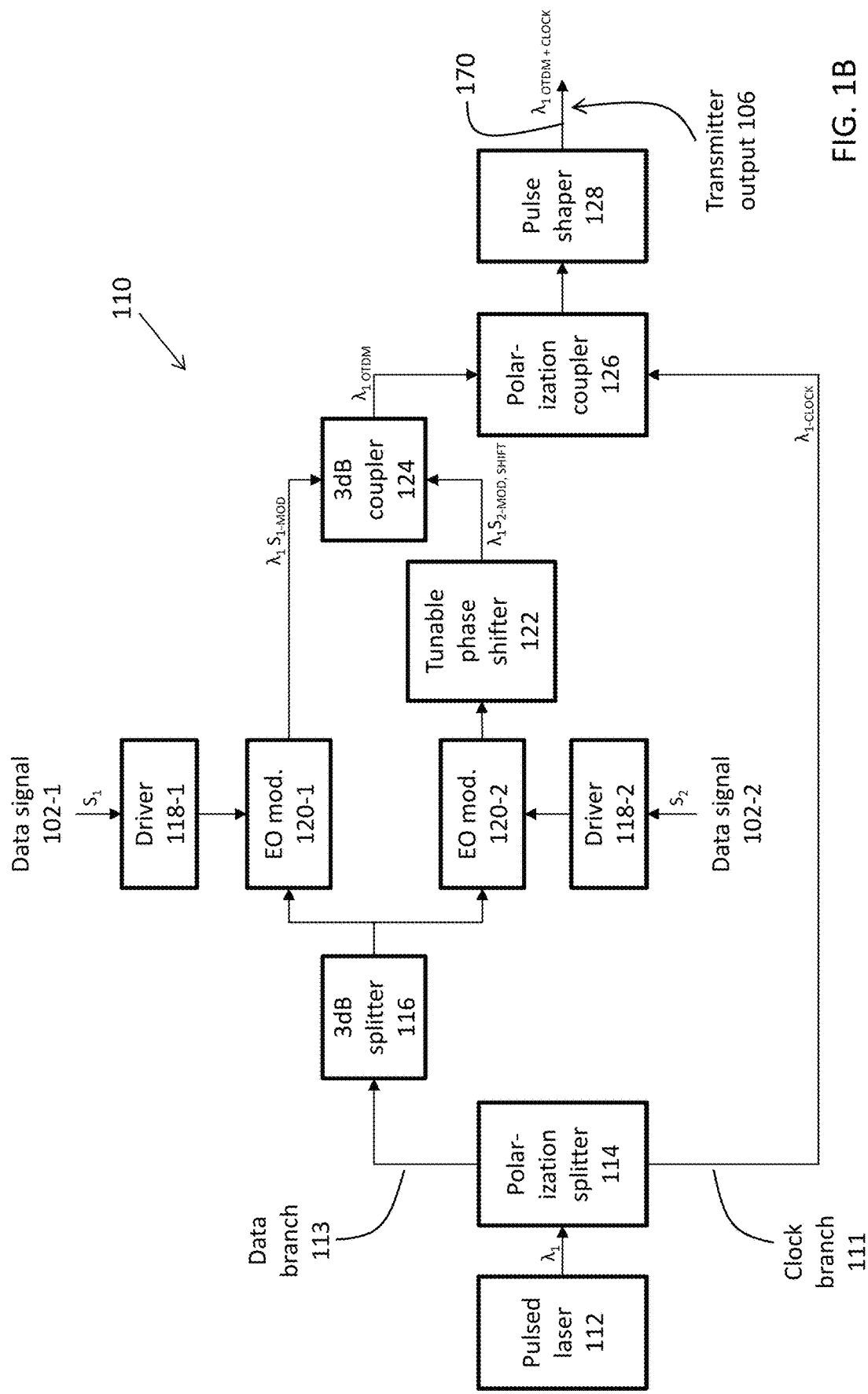
FIG. 1B shows a transmitter for use with a single mode fiber according to some embodiments.

The components of each transmitter 110 are further described with reference to FIG. 1B and include a pulsed laser 112, a polarization splitter 114, a 3 dB splitter 116, drivers 118, electro-optical (EO) modulators 120, a tunable phase-shifter 122, a 3 dB coupler 124, a polarization coupler 126 and a pulse shaper 128. In some embodiments, the components of transmitter 110 are formed on a common semiconductor as an IC.

Pulsed laser 112 provides a source pulsed laser signal that may be modulated based on data signals 102 for optical transmission of data signals 102. The pulsed laser signal is also used as a clock and is transmitted along with the modulated data to enable demodulation of the data signal. In some embodiments, pulsed laser 112 operates at a fixed wavelength here denoted $\lambda_1$. Pulsed laser 112 emits pulses at a periodic repetition rate. In some embodiments, pulsed laser 112 may be any one of a bulk laser, quantum well laser, quantum dot laser, semiconductor mode-locked laser, high-power semiconductor laser or mode-locked integrated external-cavity surface emitting laser. In some embodiments, pulsed laser 112 may support a pulse repetition rate between 5 GHz to 100 GHz. In some embodiments, pulsed laser 112 may support a pulse repetition between 100 GHz-400 GHz.

Polarization splitter 114 splits the pulsed laser signal into orthogonal transverse modes. In system 100, one mode is used for data transmission and the other mode is used for clock transmission. The data is transmitted on a data branch 113 in the TE (transverse electric) mode and the clock is transmitted on a clock branch 111 in the TM (transverse magnetic) mode, or vice versa (data on TM and clock on TE). In some embodiments, polarization splitter 114 splits the pulsed laser signal strength unequally between the two modes. Non-limiting examples of split ratios include 90/10 and 80/20. In some embodiments, polarization splitter 114 splits the pulsed laser signal equally between the two modes. It is anticipated that both modes may suffer from the same distortions during transmission with no effect on the orthogonality.

In data branch 113, transmitter 112 provides for OTDM of multiple data signals 102 (or 104). Exemplarily, two data signals 102-1 and 102-2 as well as two drivers 118-1, 118-2 and two EO modulators 120-1, 120-2 are shown for simplicity, but it should be appreciated that multiple (more than two) data signals may be supported. 3 dB splitter 116 splits the pulsed transverse mode laser signal according to the number of data signals supported (here shown as two). In some embodiments, each data signal 102 is input into transmitter 112 via drivers 118. Driver 118 may supply power to EO modulator 120 and may adjust the electrical signal level of the input data signal 102.

EO modulator 120 modulates the source pulsed laser signal based on input data signals 102. In some embodiments, EO modulator may include a digital to analog converter (DAC) (not shown) for handling analog electrical inputs. In some embodiments, the pulse (clock) rate and thus the modulated channel rate is:

R/(number of channels)

Various modulation schemes including but not limited to pulsed amplitude modulation (PAM) or quadrature amplitude modulation (QAM) can be applied. Tunable phase-shifter 122 shifts the phase of the second and further channels to obtain modulated (phase-shifted) channels (indicated as $\lambda 1_{S1\text{-}MOD}$, $\lambda 1_{S2\text{-}MOD, SHIFT}$) so that channel pulses will be interleaved when combined at 3 dB coupler 124. Coupler 124 combines the modulated (phase-shifted) channels (indicated as $\lambda 1_{S1\text{-}MOD}$, $\lambda 1_{S2\text{-}MOD, SHIFT}$) to form an OTDM output signal (indicated as $\lambda_{1\ OTDM}$) of data branch 113 having a pulse rate of:

Rx(number of channels)

Figure 1C:
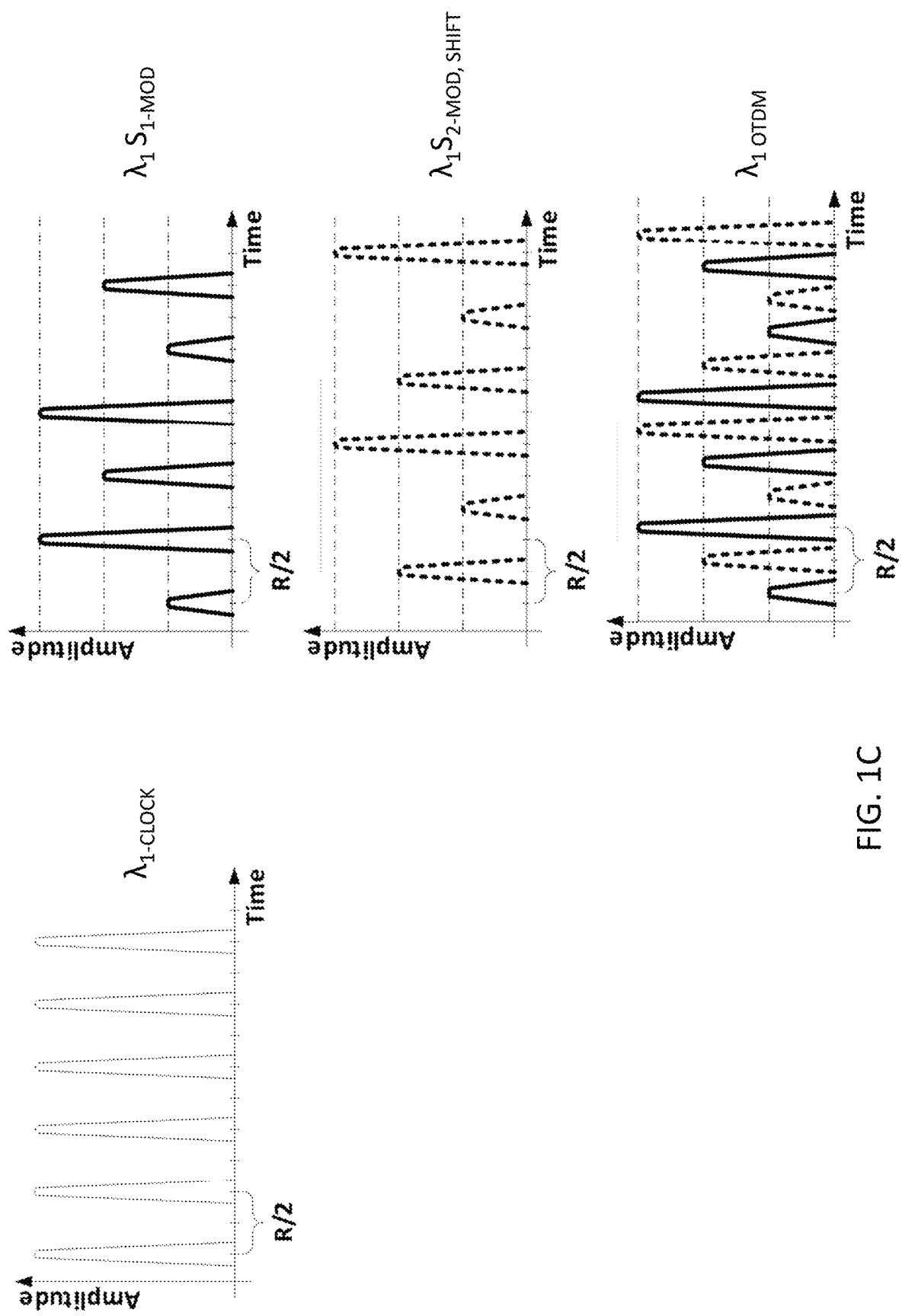
FIG. 1C shows illustrative signal amplitude graphs of the of the optical signals within the transmitter according to some embodiments.

FIG. 1C shows illustrative signal amplitude graphs of the modulated (phase-shifted) channels (indicted as $\lambda 1_{S1\text{-}MOD}$, $\lambda 1_{S2\text{-}MOD, SHIFT}$) and the combined OTDM output (indicated as $\lambda_{1\ OTDM}$) of data branch 113 as well as the clock signal (indicated as $\lambda_{1\ CLOCK}$).

Polarization coupler 126 combines the transverse modes of the data and clock branches 111 and 113 to form orthogonal transverse signals carrying the OTDM output and the clock, indicated as $\lambda 1_{OTDM+CLOCK}$. In some embodiments, pulse shaper 128 shapes and equalizes the pulse heights and shapes of $\lambda 1_{OTDM+CLOCK}$ to form the transmitter output 106. In some embodiments, pulse shaper 128 may be coupled to a fiber optic cable 170. In some embodiments, pulse shaper 128 may feed into a WDM multiplexer as describe further below. In some embodiments, pulse shaping may be implemented using filter banks. In some embodiments, pulse shaping may be implemented using nested unbalanced Mach-Zehnder interferometers (MZIs), ring resonators, or a combination of MZIs and ring resonators. Transmitter output 106 is transmitted on fiber optic cable 170 towards receiver 140.

In transmitter 110, controller 160 may monitor and control all components and provide for automatic adjustment of adjustable components such as phase-shifters 122, pulse shapers 128, and drivers 118.

Figure 1D:
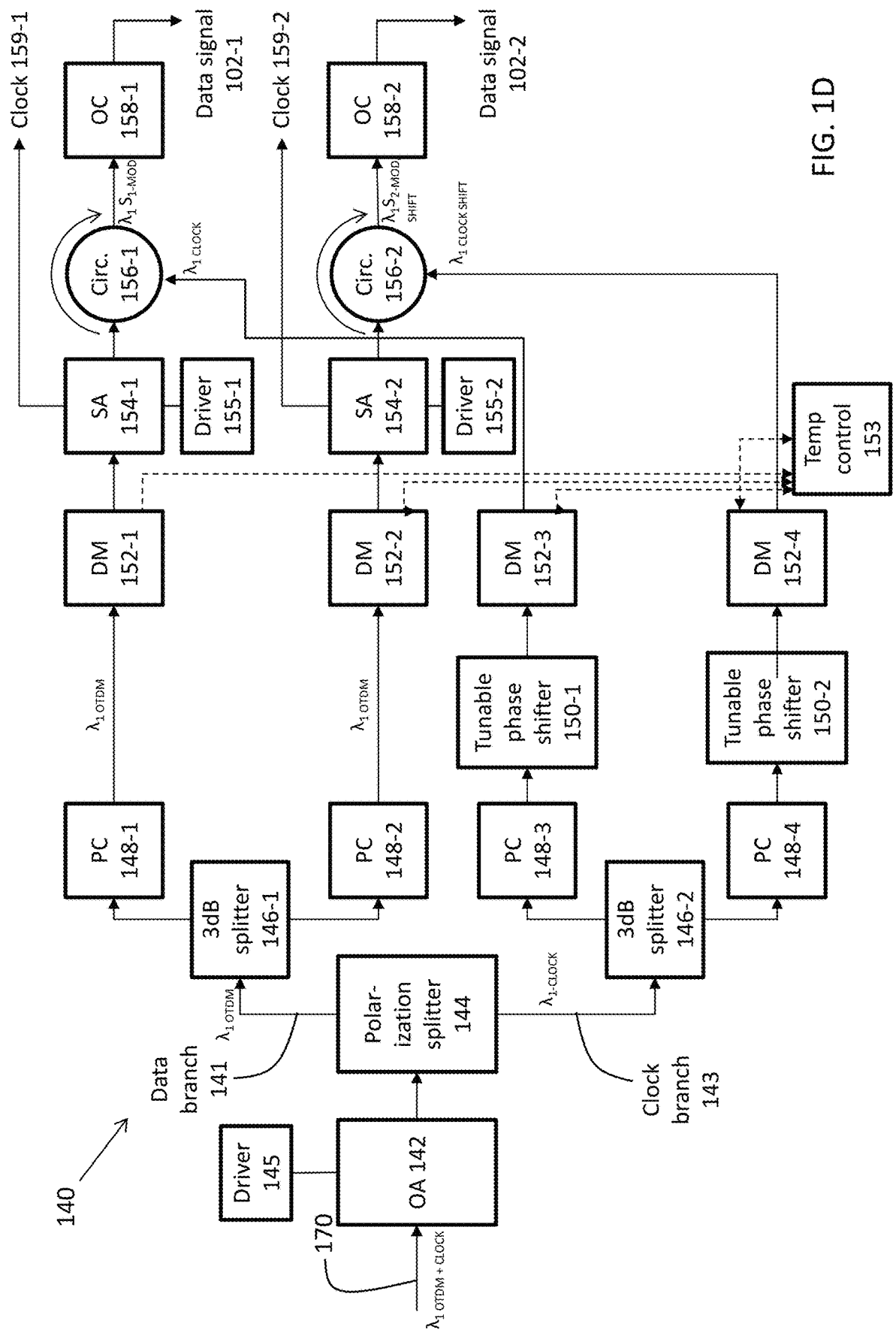
FIG. 1D shows a receiver for use with a single mode fiber according to some embodiments.

The components of each receiver 140 are further described with reference to FIG. 1D and may include an optical amplifier (OA) 142, a polarization splitter 144, splitters 146, polarization/phase controllers (PC) 148, tunable phase-shifters 150, dispersion managers 152, saturable absorbers 154, drivers 155, circulators 156, and output components 158. In some embodiments, the components of receiver 140 may be formed on a common semiconductor substrate as an IC.

OA 142 boosts the signal received from transmitter 110. In some embodiments, OA 142 may be coupled to fiber optic cable 170. In some embodiments, OA 142 may be connected to a WDM demultiplexer as described further below. In some embodiments, OA 142 may be a quantum dot semiconductor optical amplifier that has low power consumption and minimal cross talk between different wavelengths. In some embodiments, a driver 145 may supply power to OA 142.

The output of OA 142 ($\lambda_{1\ OTDM+CLOCK}$) is fed into polarization splitter 144, which splits the received signal ($\lambda_{1\ OTDM+CLOCK}$) into orthogonal transverse modes. The data mode (TM or TE as defined in the transmitter) is transmitted on a data branch 141 and the clock mode (TM or TE as defined in the transmitter) is transmitted on a clock recovery branch 143. In some embodiments, polarization splitter 144 splits the received signal unequally between the two modes. Non-limiting examples of split ratios include 90/10 and 80/20. In some embodiments, polarization splitter 144 splits the received signal equally between the two modes.

Figure 1E:
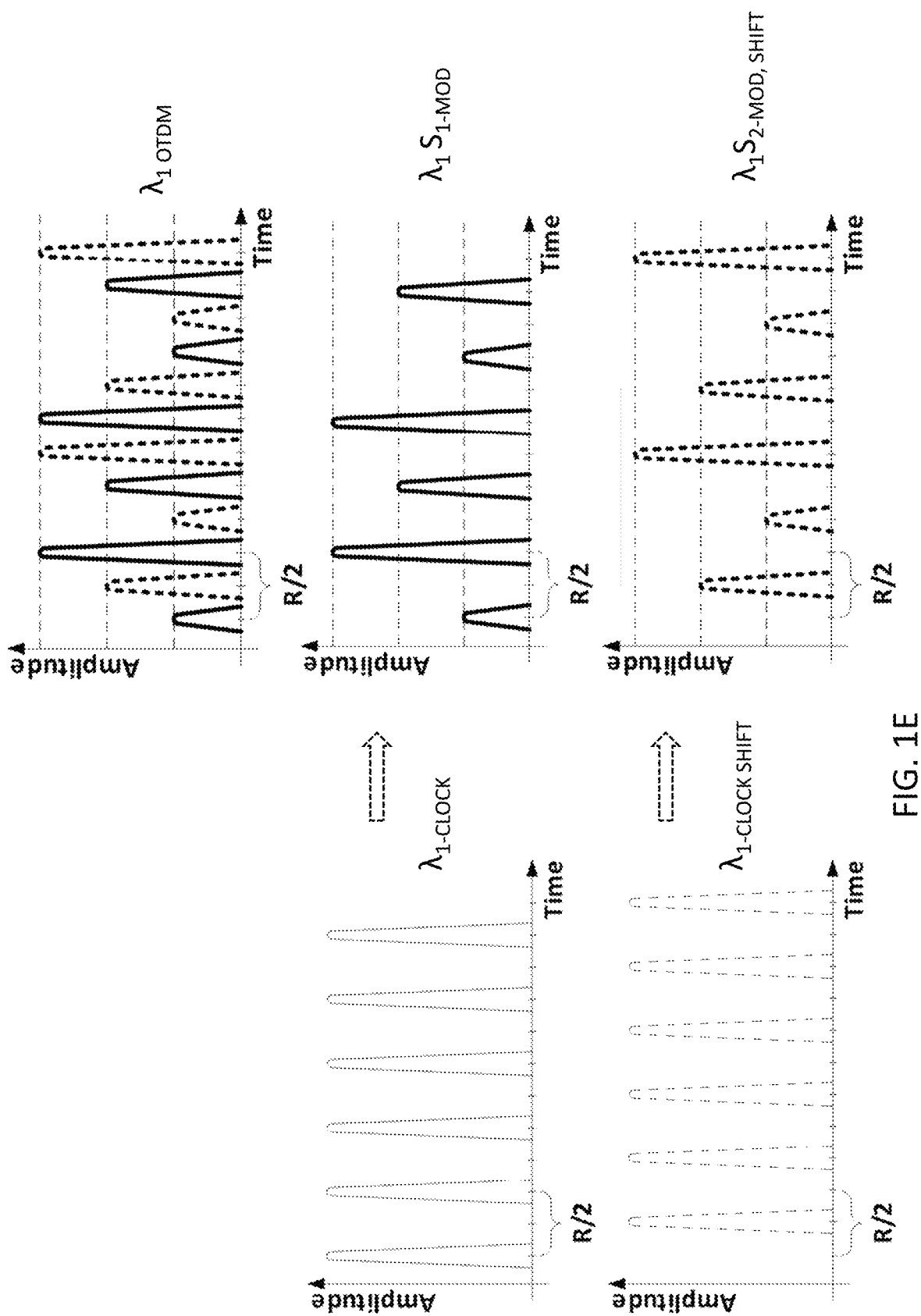
FIG. 1E shows illustrative signal amplitude graphs of the optical signals within the receiver according to some embodiments.

FIG. 1E shows illustrative signal amplitude graphs of the combined OTDM signal (here indicated as $\lambda_{1\ OTDM}$) split within data branch 141, the recovered clock and phase-shifted clocks (here indicated as $\lambda_{1\text{-}CLOCK}$, $\lambda_{1\text{-}CLOCK\ SHIFT}$) of clock branch 143 and the recovered modulated (phase-shifted) channels (here indicated as $\lambda 1_{S1\text{-}MOD}$, $\lambda 1_{S2\text{-}MOD, SHIFT}$).

In data branch 141, splitter 146-1 splits the OTDM according to the number of channels that were time division multiplexed by transmitter 110. Thus, each split of data branch 141 carries $\lambda_{1\ OTDM}$. Similarly, in clock branch 143, splitter 146-2 splits the clock signal $\lambda_{1\text{-}CLOCK}$ according to the number of channels that were time division multiplexed by transmitter 110. As above, two OTDM channels and corresponding two clock channels are shown for simplicity, but it should be appreciated that multiple channels may be demultiplexed.

In some embodiments, polarization/phase controllers (PC) 148 may be provided for matching the polarization and to correct phase mismatches. Exemplarily, multiple PCs 148-1 . . . 148-4 are provided, each on a separate signal or clock branch. Tunable phase-shifters 150-1 and 150-2 shift the phase of the clock channels so that clock pulses will be timed to coincide with the interleaved channels of the OTDM signal in data branch 141. Each dispersion manager (DM) 152 may correct for dispersion in the optical channel that has affected the data and/or clock signals. Exemplarily, multiple DMs 152-1 . . . 152-4 are provided, each on a separate branch. DM 152 further may introduce pre-correction for dispersion introduced by a SA 154. In some embodiments, a DM 152 may include chirped Bragg gratings controlled by a temperature controller 153. In some embodiments, a driver 155 may supply power to a respective SA 154.

Each output of clock branch 143 (here indicated as $\lambda_{1\ CLOCK}$ and $\lambda_{1\ CLOCK\ SHIFT}$) is fed into a corresponding circulator 156 in the data branch 141. Exemplarily, two circulators 156-1, 156-2, two SAs 154-1, 154-2, and two drivers 155-1, 155-2 are shown corresponding to two multiplexed data channels. In some embodiments, circulators 156 may be non-reciprocating, one directional, three-port circulators. In FIG. 1D, circulators 156 are shown as having a clockwise direction, but it should be appreciated that the direction employed will be functional. In use, the clock input is circulated to an SA 154. In some embodiments, each SA 154 may be any one of a quantum well (QW) semiconductor SA, a quantum dot SA, or a bulk semiconductor SA.

A clock pulse will saturate SA 154, forcing SA 154 to be transparent to thus "release" or "transmit" the current OTDM interleaved channel pulse through SA 154 corresponding to the pulse period. Thus, $\lambda_{1\ CLOCK}$ and $\lambda_{1\ CLOCK\ SHIFT}$ will each respectively saturate SA 154-1 and SA 154-2 at different time periods, each time period corresponding to a separate OTDM channel, to thereby release the current OTDM channel pulse through SA 154. When the clock signal is between pulses (low clock signal), SA 154 is not saturated, thus blocking other OTDM channels. In some embodiments, each SA 154-1 or 154-2 provides an electrical output of each recovered clock 159-1 or 159-2.

The released OTDM pulse will enter circulator 156 and will be circulated to output components (OC) 158. Each OC 158 includes those components necessary for converting the released optical channel back into an electrical data signal 102. Exemplarily, two OCs 158-1, 158-2 are shown, corresponding to two multiplexed data channels. OC 158 may include one or more of a photodiode (PD) or a PD array for optical-to-electrical conversion, a transimpedance amplifier (TIA), a DAC, and/or a limiting amplifier (LA).

In receiver 140, controller 160 may monitor and control all components and provide for automatic adjustment of adjustable components such as phase-shifters 150, OA 142, drivers 145, 155, and DMs 152. In some embodiments, controller 160 monitors transceiver 108 performance in terms of one or more of bit error rate, data throughput, frame loss, jitter, and other parameters, and then performs adjustment of adjustable components (in both of transmitter 110 and receiver 140) in order to optimize the transceiver 108 performance.

Figure 1F:
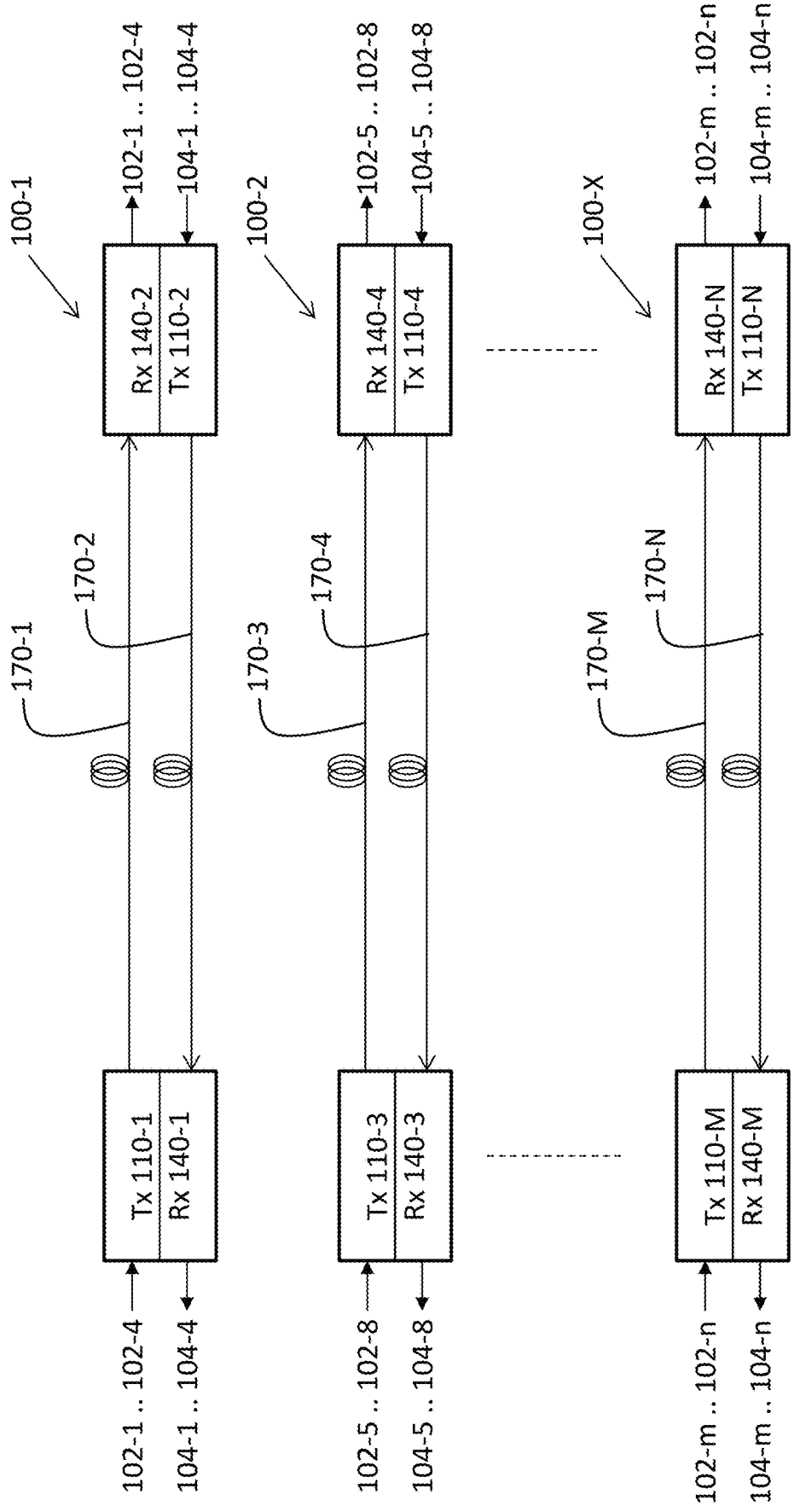
FIGS. 1F and 1G show multiple optical transmission systems according to some embodiments.

As shown in FIG. 1F, in some embodiments, multiple systems 100-1, 100-2, to 100-X (where X=N/2) may be provided in parallel, each system 100 operating over a separate pair of fiber optic cables 170-1 and 170-2. As further shown, each of systems 100 may provide OTDM of up to four channels in each direction (102, 104). In some embodiments, more than four channels may be provided. Each of systems 100-1, 100-2, 100-X may operate using a pulsed laser 112 with the same wavelength or different wavelengths or a combination of wavelengths.

Figure 1G:
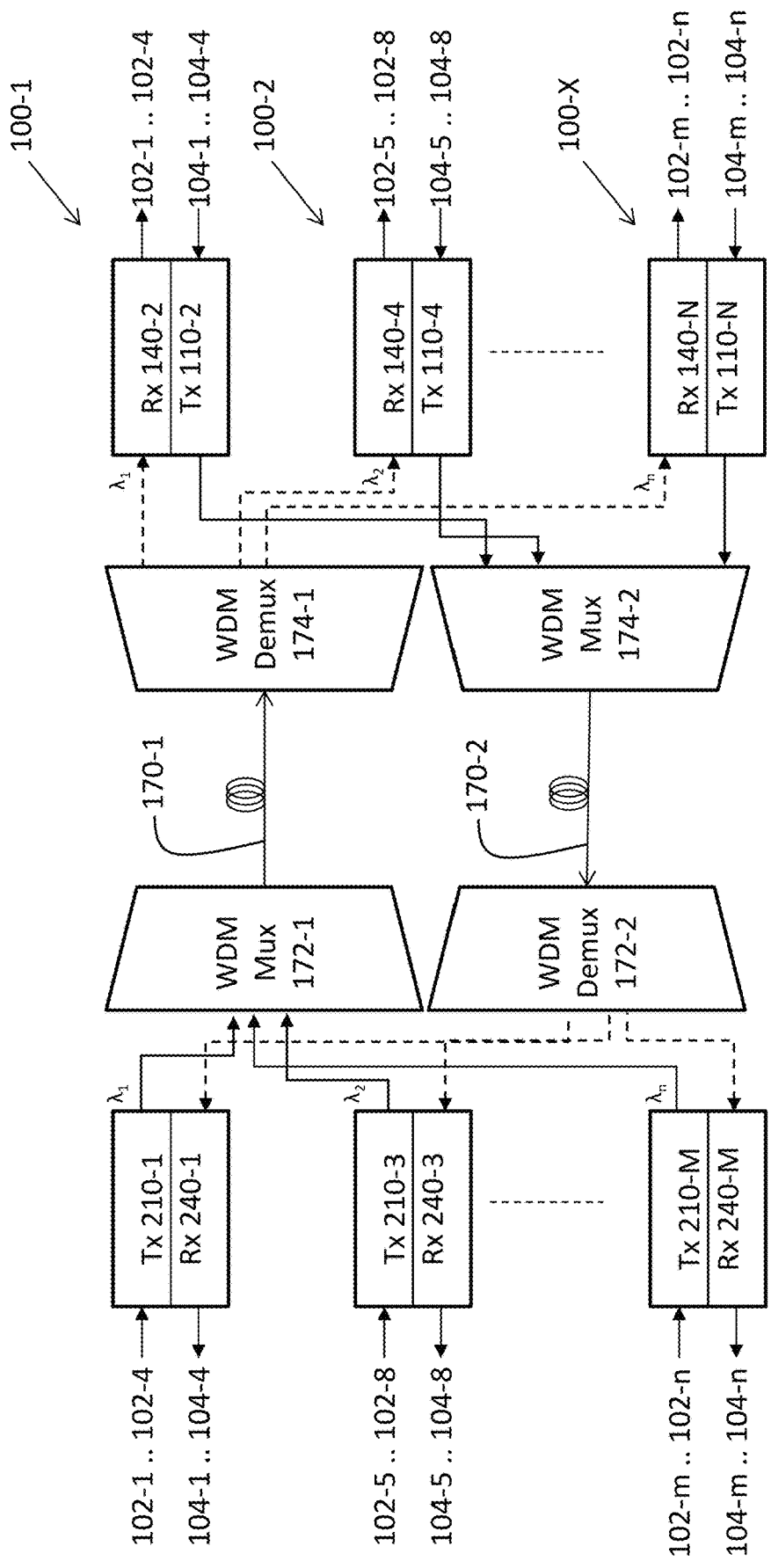

As shown in FIG. 1G, in some embodiments, multiple systems 100-1 to 100-X may be provided in parallel along with a wavelength division multiplexing (WDM) multiplexers 172-1 and 174-2 and demultiplexers 172-2 and 174-1, each operating over a respective single fiber optic cable 170-1 and 170-2. For operation using WDM, each of systems 100-1, 100-2 . . . 100-N uses a respective pulsed laser 112 with a different wavelength. As further shown in FIG. 1G, each of systems 100 may provide OTDM of up to four channels in each direction (102, 104). In some embodiments, more than four channels may be provided.

Figure 2A:
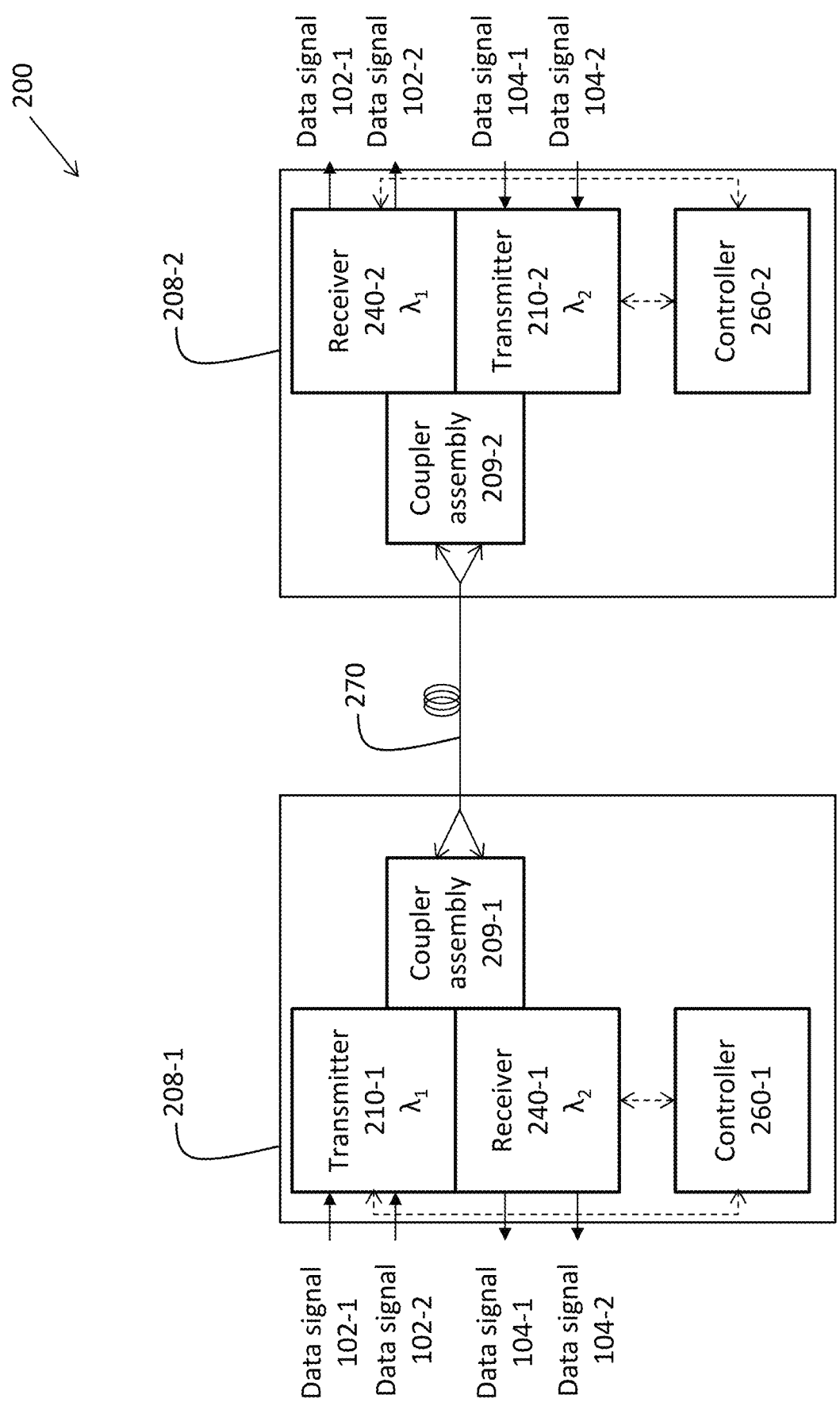
FIG. 2A shows an optical system for data transmission over full duplex fiber according to some embodiments.

FIGS. 2A-2F show an optical system for bidirectional data transmission over a full-duplex fiber according to some embodiments. As shown in FIG. 2A, an optical transmission system 200 includes transceivers 208-1 and 208-2. Each transceiver 208 includes an optical transmitter 210, an optical receiver 240, a coupling assembly 209, and a controller 260.

Transmitter 210-1 is in optical communication with receiver 240-2 over a full duplex fiber optic cable 270 for transmitting data signals 102 using a first wavelength ($\lambda_1$), and transmitter 210-2 is in optical communication with receiver 240-1 over full duplex fiber optic cable 270 for transmitting data signals 104 using a second wavelength ($\lambda_2$). In some embodiments, each of transceivers 208 is provided as an IC on a shared semiconductor substrate.

Data signals 102, 104 are electrical data signals. In some embodiments, data signals 102, 104 are digital signals and the laser pulse repetition rate is equal or larger than the digital signal rate. In some embodiments, data signals 102, 104 are analog electrical signals and the laser pulse repetition rate is equal or larger to the Nyquist frequency of the analog electrical signals. In some embodiments, data signals 102, 104 are a combination of digital and analog signals. FIGS. 2A-2F illustrate transmission of two channels in each transmission direction (data signals 102-1 and 102-2 and data signals 104-1 and 104-2) for simplicity but it should be appreciated that more than two channels may be transmitted by system 200. In some embodiments, between 2-16 data signals per wavelength are supported.

Each controller 260 is a computing device as defined herein. Controller 260-1 is in data communication with transmitter 210-1 and receiver 240-1 and controller 260-2 is in data communication with transmitter 210-2 and receiver 240-2 for controlling each of transceivers 208-1 and 208-2 for the operation of system 200 as described further below. In some embodiments, each of coupling assembly 209-1, 209-2 is in data communication with its respective controller 260-1, 260-2.

Figure 2B:
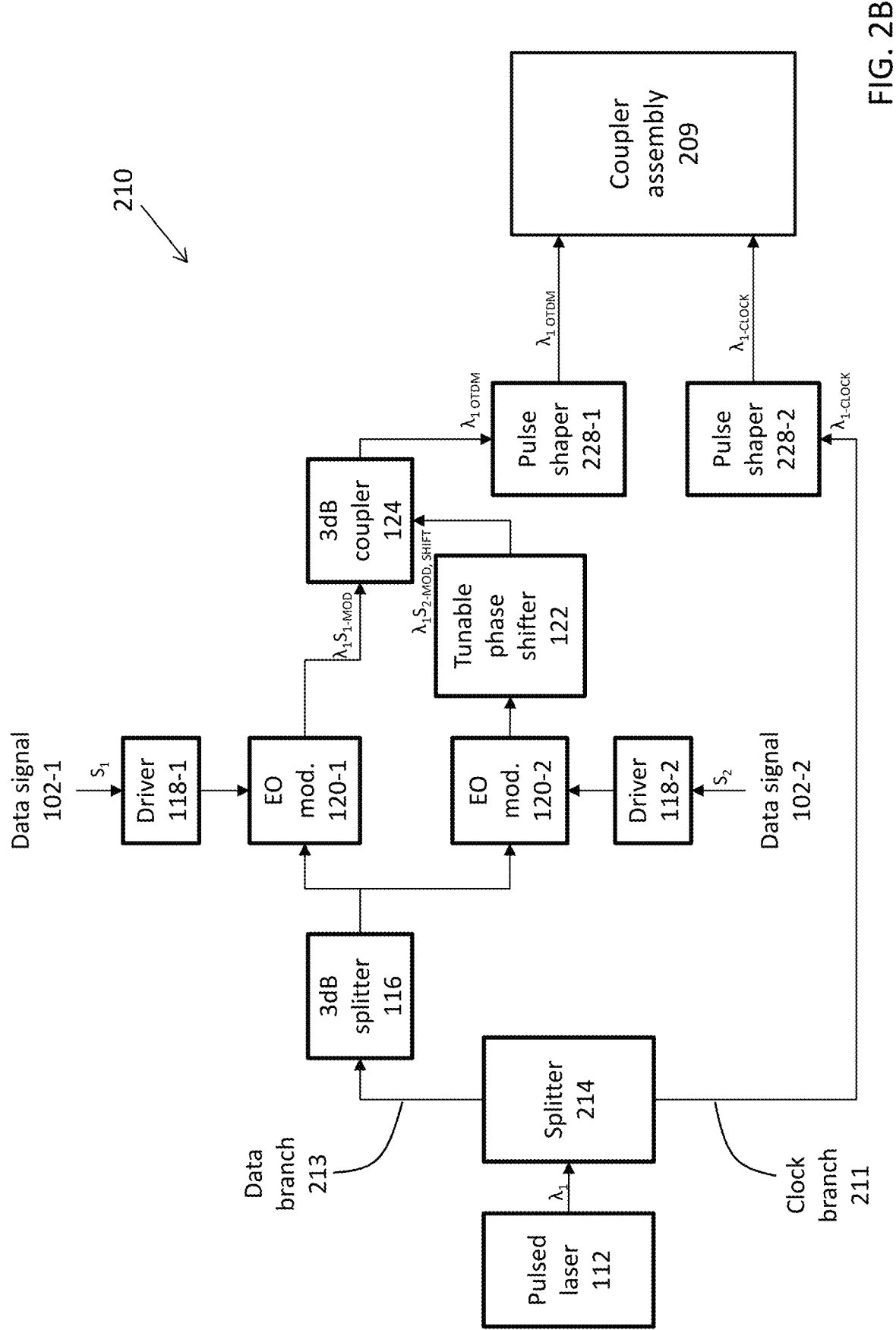
FIG. 2B shows a transmitter for use with a full duplex fiber according to some embodiments.

The components of each transmitter 210 are further described with reference to FIG. 2B and include a pulsed laser 112, a splitter 214, a 3 dB splitter 116, drivers 118, EO modulators 120, a tunable phase-shifter 122, a 3 dB coupler 124, and pulse shapers 228. In some embodiments, the components of transmitter 210 are formed on a common semiconductor as an IC. Like numbered components of transmitter 110 are the same components and provide the same functionality in transmitter 210 and are therefore not described again.

Splitter 214 splits the pulsed laser signal into a data branch 213 for preparing an OTDM signal for transmission and into a clock branch 211 for clock transmission. In some embodiments, splitter 214 splits the pulsed laser signal strength unequally between the two branches. Non-limiting examples of split ratios include 90/10 and 80/20. In some embodiments, splitter 214 splits the pulsed laser signal equally between the two branches.

In data branch 213, transmitter 212 provides for OTDM of multiple data signals 102 (or 104). Two data signals 102-1 and 102-2 are shown for simplicity but it should be appreciated that multiple data signals may be supported. Data branch 213 functionality is the same as for system 100 and forms the OTDM output (indicated as MI OTDM) of data branch 213 having a pulse rate of R×(number of channels).

In some embodiments, pulse shaper 228-1 shapes and equalizes the pulse heights and shapes of $\lambda_{1\ OTDM}$. In some embodiments, pulse shaper 228-2 shapes and equalizes the pulse heights of $\lambda_{1\ CLOCK}$. In some embodiments, pulse shaping may be implemented using filter banks. In some embodiments, pulse shaping may be implemented using nested unbalanced MZIs or ring resonators or a combination of MZIs and ring resonators.

Figure 2C:
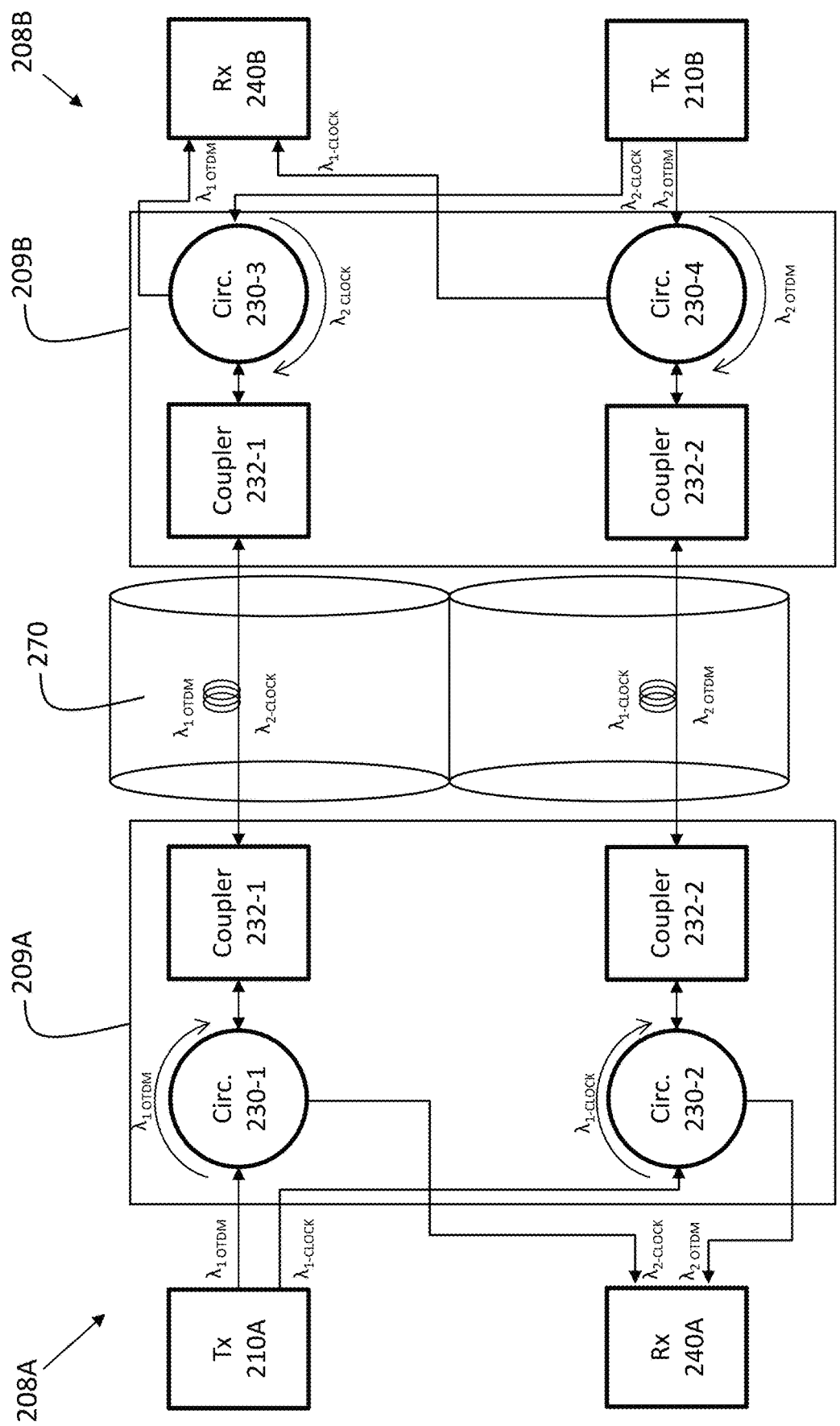
FIG. 2C shows a coupling assembly for use with a full duplex fiber according to some embodiments.

As shown in FIG. 2C, the output of transmitter 210 feeds into coupling assembly 209. Each coupling assembly 209 includes circulators 230 and couplers 232. Pulse shaper 228-1 feeds $\lambda_{1\ OTDM}$ into optical circulator 230-1 and pulse shaper 228-2 feeds $\lambda_{1\ CLOCK}$ into optical circulator 230-2. In some embodiments, circulators 230 may be a non-reciprocating, one directional, three-port circulators. In FIG. 2C circulators 230 are shown as having a clockwise direction, but It should be appreciated that the direction employed will be functional.

One of the circulator 230 ports is connected to couplers 232. Coupler 232-1 couples the outgoing (Tx) $\lambda_{1\ OTDM}$ to a first of the fibers in cable 270 and coupler 232-2 couples outgoing $\lambda_{1\ CLOCK}$ to a second of the fibers in fiber optic cable 270. The incoming (Rx) clock and OTDM signals $\lambda_{2\ OTDM}$ and $\lambda_{2\ CLOCK}$ from cable 270, exit couplers 232 and are directed by circulators 230 to exit ports of circulators 230 that are coupled to a "same-side" receiver 240 input.

In transmitter 210, controller 160 may monitor and control all components and provide for automatic adjustment of adjustable components such as phase-shifters 122, pulse shapers 228, and drivers 118.

Figure 2D:
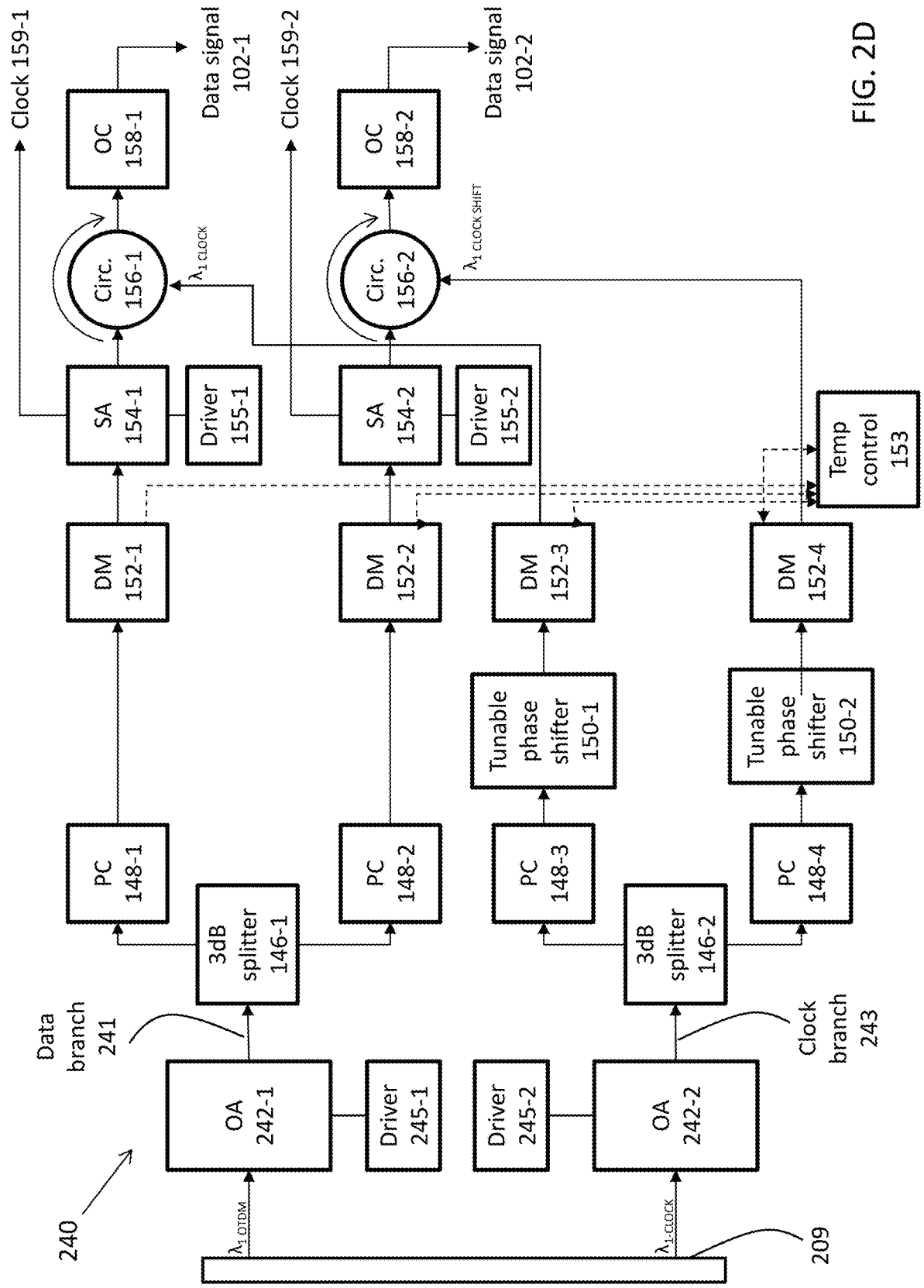
FIG. 2D shows a receiver for use with a full duplex fiber according to some embodiments.

The components of each receiver 140 are further described with reference to FIG. 2D and may include optical amplifiers (OA) 242, splitters 146, polarization/phase controllers (PC) 148, tunable phase-shifters 150, dispersion managers 152, saturable absorbers 154, drivers 155, circulators 156, and output components 158. In some embodiments, the components of receiver 240 may be formed on a common semiconductor as an IC. Like numbered components of receiver 140 are the same components and provide the same functionality in receiver 240 and are therefore not described again.

OA 242-1 boosts the OTDM signal received from transmitter 210. OA 242-2 boosts the clock signal received from transmitter 210. Both of OAs 242 may be coupled to fiber optic cable 270 via coupling assembly 209. In some embodiments, OA 242 may be connected to a WDM demultiplexer as described further below. In some embodiments, OA 242 may be a quantum dot semiconductor optical amplifier that has low power consumption and minimal cross talk between different wavelengths. In some embodiments, drivers 245 may supply power to OAs 242.

The output of OA 242-1 is fed into a data branch 241 and the output of OA 242-2 is transmitted on a clock branch 243. The functionality and operation of data branch 241 are the same as data branch 141 as described above, and the functionality and operation of clock branch 243 are the same as clock branch 143 as described above.

In receiver 240, controller 260 may monitor and control all components and provide for automatic adjustment of adjustable components such as phase-shifters 150, OAs 242, drivers 155, and DMs 152. In some embodiments, controller 260 monitors transceiver 208 performance in terms of one or more of bit error rate, data throughput, frame loss, jitter, and other parameters, and then performs adjustment of adjustable components (in both of transmitter 210 and receiver 240) in order to optimize the transceiver 208 performance.

Figure 2E:
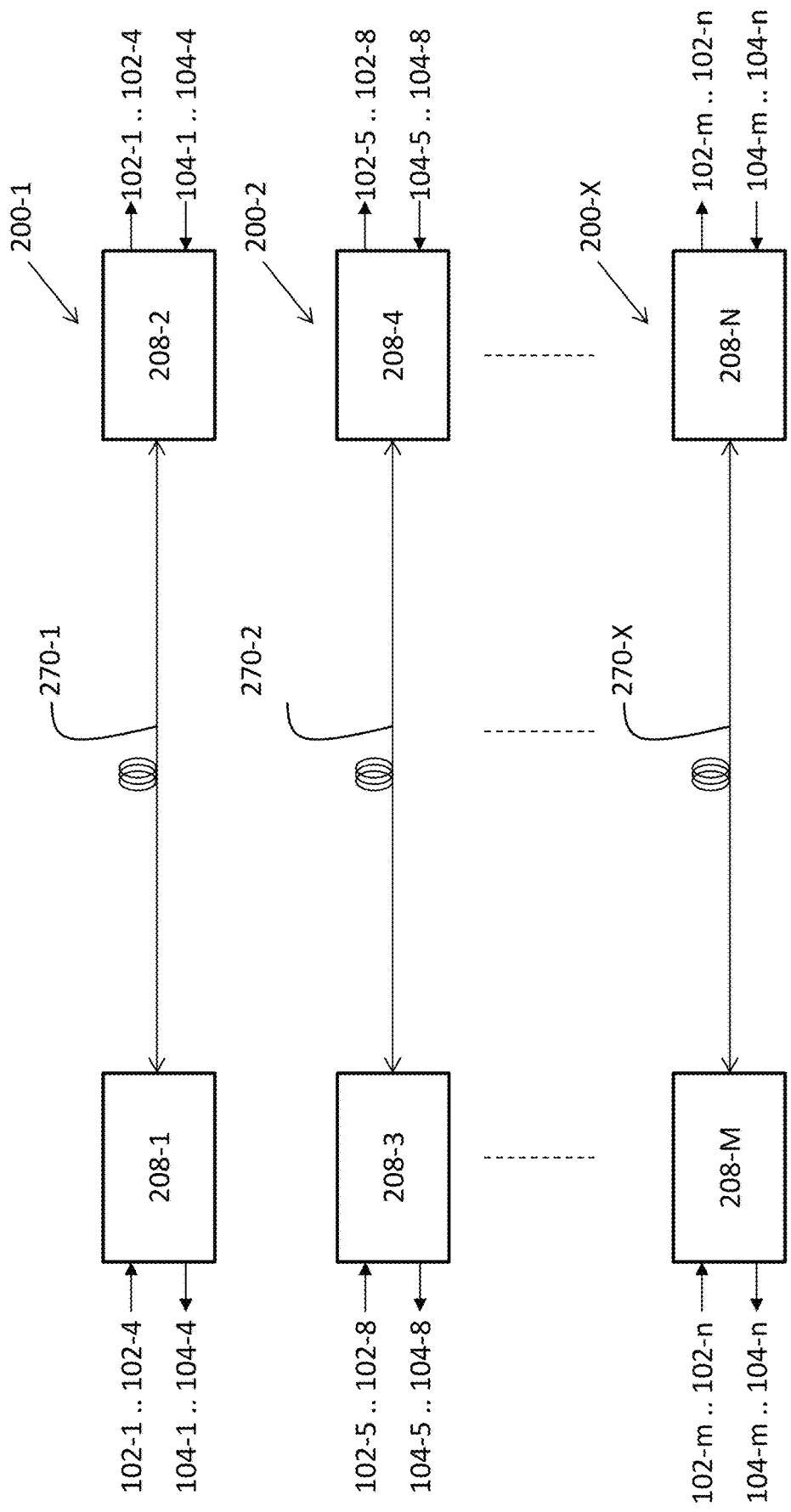
FIGS. 2E and 2F show multiple optical transmission systems according to some embodiments.

As shown in FIG. 2E, in some embodiments, multiple systems 200-1, 200-2, to 200-X (where X=N/2) may be provided in parallel each operating over a separate full duplex fiber optic cable 270-1, 270-2 . . . 270-X. As further shown, each of systems 200 may provide OTDM of up to four channels in each direction (102, 104). In some embodiments, more than four channels may be provided. Each of systems 200-1, 200-2 . . . 200-X may operate using a pulsed laser 112 with the same wavelength or different wavelengths or a combination of wavelengths.

Figure 2F:
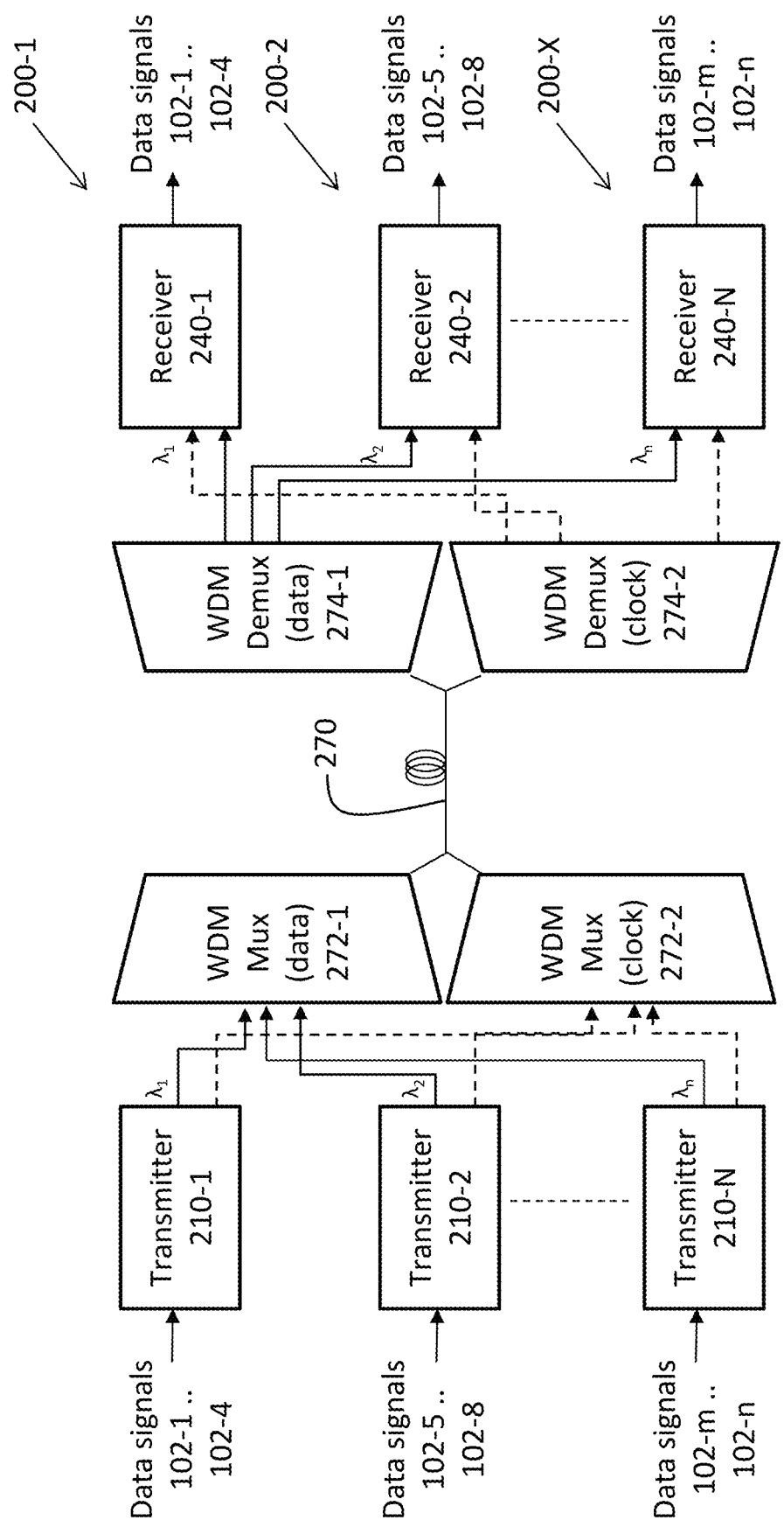

As shown in FIG. 2F, in some embodiments, multiple systems 200 may be provided in parallel along with a dual WDM multiplexers 272-1 and 272-2 and demultiplexers 274-1 and 274-2 operating over a full duplex fiber optic cable 270. For simplicity only one direction of transmission is shown in FIG. 2F. OTDM signals are transmitted using WDM pair 272-1 and 274-1 and clock signals are transmitted using WDM pair 272-2 and 274-2. In some embodiments, one OA 242 is positioned before demultiplexer 274-1 and one OA 242 is positioned before demultiplexer 274-2. For operation using WDM, each of systems 200-1, 200-2 . . . 200-X uses a pulsed laser 112 with a different wavelength. As further shown, each of systems 200 may provide OTDM of up to four channels. In some embodiments, more than four channels may be provided.

In the claims or specification of the present application, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing platform for executing a plurality of instructions.

Although the present disclosure is described with regard to a computing device, or a computer, it should be noted that optionally any device featuring a data processor and the ability to execute one or more instructions may be described as a computing device, including but not limited to any type of personal computer (PC), a server, a distributed server, a master control unit, a virtual server, a cloud computing platform, a cellular telephone, an IP telephone, a smartphone, a smart watch or a PDA (personal digital assistant). Any two or more of such devices in communication with each other may optionally form a "network" or a "computer network".

It should be understood that where the claims or specification refer to "a" or "an" element, such reference is not to be construed as there being only one of that element. In the description and claims of the present application, each of the verbs, "comprise" "include" and "have", and conjugates thereof, are used to indicate that the object or objects of the verb are not necessarily a complete listing of components, elements or parts of the subject or subjects of the verb.

While this disclosure describes a limited number of embodiments, it will be appreciated that many variations, modifications and other applications of such embodiments may be made. The disclosure is to be understood as not limited by the specific embodiments described herein, but only by the scope of the appended claims.

What is claimed is:

1. A method, comprising:
providing an optical transmitter having a pulsed laser, an optical receiver having a data branch with a plurality of saturable absorbers (SA) and a clock branch, and a polarization splitter;
by the pulsed laser, outputting a pulsed laser signal;
modulating the pulsed laser signal based on a plurality of data signals to form a plurality of modulated optical data signals;
optically time division multiplexing the plurality of modulated optical data signals to obtain a multiplexed optical data signal;
by the polarization splitter, splitting the pulsed laser signal into the data branch and into the clock branch for transmitting the multiplexed optical data signal through the data branch and for transmitting an optical clock signal separately through the clock branch, wherein the clock branch is configured to recover and phase-shift the optical clock signal into a plurality of phase-shifted recovered optical clock signals, and wherein each of the SAs is in optical communication with one of the plurality of phase-shifted recovered optical clock signals; and
configuring each of the SAs to receive the multiplexed optical data signal and to demultiplex one of the modulated optical data signals according to a respective optical clock signal from the plurality of phase-shifted recovered optical clock signals.

2. The method of claim 1, wherein the transmitting of the multiplexed optical data signal and of the optical clock signal includes transmitting the multiplexed optical data signal and the optical clock signal in orthogonal transverse modes over a single mode fiber optic cable.

3. The method of claim 1, wherein the transmitting of the multiplexed optical data signal and of the optical clock signal includes transmitting the multiplexed optical data signal and the optical clock signal over a separate cable in a full-duplex fiber optic cable.

4. The method of claim 1, further comprising saturating a respective one of the SAs to thereby cause the respective one of the SAs to release a pulse from one of the plurality of modulated optical data signals.

5. The method of claim 1, further comprising extracting the optical clock signal into the plurality of phase-shifted recovered optical clock signals.

6. The method of claim 1, further comprising correcting dispersion related to each of the plurality of modulated optical data signals and the plurality of phase-shifted recovered optical clock signals.

7. The method of claim 1, further comprising extracting the plurality of data signals from each of the plurality of modulated optical data signals.

8. The method of claim 1, wherein the modulating of the pulsed laser signal includes modulating using pulsed amplitude modulation (PAM) or quadrature amplitude modulation (QAM).

9. The method of claim 1, wherein the pulsed laser is selected from the group consisting of a bulk laser, a quantum well laser, a quantum dot laser, a semiconductor mode-locked laser and a mode-locked integrated external-cavity surface emitting laser.

10. The method of claim 1, wherein the pulsed laser has a pulse repetition rate between 5 GHz to 100 GHz.

11. The method of claim 1, wherein the optical receiver includes an optical amplifier (OA).

12. The method of claim 11, wherein the OA is a quantum dot semiconductor optical amplifier.

13. The method of claim 1, wherein the plurality of data signals includes between 2-16 data channels.

14. The method of claim 1, wherein the plurality of data signals includes digital signals and/or analog signals.

* * * * *